United States Patent Office 3,105,837
Patented Oct. 1, 1963

3,105,837
2,2′-ALKYLENEBISBENZIMIDAZOLES
Joseph J. Ursprung, Portage Township, Kalamazoo County, Mich., assignor to The Upjohn Company, Kalamazoo, Mich., a corporation of Delaware
No Drawing. Filed Oct. 20, 1961, Ser. No. 146,432
9 Claims. (Cl. 260—309.2)

This invention pertains to novel organic compounds, and is more particularly directed to monoamino-substituted 2,2′-alkylenebisbenzimidazoles and the acid addition salts thereof.

The novel compounds of the invention are selected from the class consisting of (a) the compound of the formula:

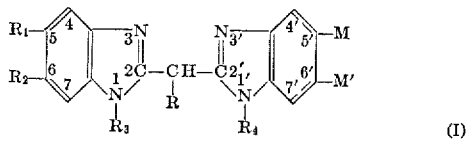

(I)

wherein R, $R_3$, and $R_4$ are selected from the class consisting of hydrogen and alkyl of from 1 to 6 carbon atoms, inclusive, for example, methyl, ethyl, propyl, butyl, amyl, hexyl, and isomeric forms thereof, $R_1$ and $R_2$ are alkyl of from 1 to 3 carbon atoms, inclusive, for example, methyl, ethyl, propyl, and isopropyl, and one of M and M′ is amino (—$NH_2$), the other being hydrogen, and (b) the acid addition salts thereof.

The novel monoamino-substituted 2,2′-alkylenebisbenzimidazoles of this invention exhibit pharmacological activity, and they can be used as diuretics and sedatives in mammals. In addition, the monoamino-substituted 2,2′-methylenebisbenzimidazoles of this invention are valuable intermediates and can be substituted for di(2-benzimidazolyl)-methane in the process described in U.S. Patent 2,697,712 for the preparation of 1,1,2,2-tetra(2-benzimidazolyl)-ethylene coloring compounds.

The novel compounds of the invention having the Formula I can be prepared in a convenient manner as follows:

(a) A 4,5-dialkyl-1,2-phenylenediamine of the formula:

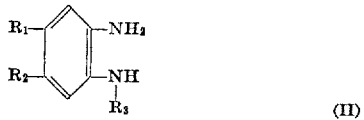

(II)

wherein $R_1$, $R_2$, and $R_3$ are as defined hereinbefore, is condensed with an acid addition salt of a carbalkoxyacetimino alkyl ether, illustratively, a carbalkoxyacetimino alkyl ether hydrohalide, e.g.,

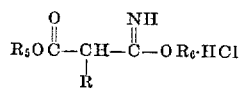

wherein $R_5$ and $R_6$ represent alkyl groups, preferably ethyl, and R is as defined hereinbefore, to form the corresponding alkyl 2-(5,6-dialkyl-2-benzimidazolyl)alkanoate according to the following equation:

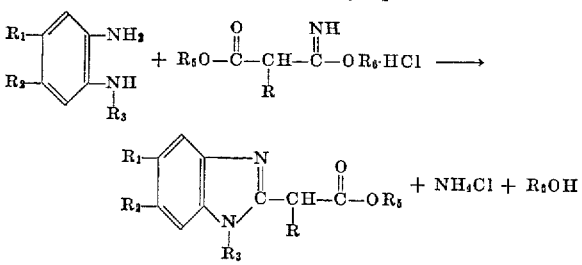

wherein R, $R_1$, $R_2$, $R_3$, $R_5$, and $R_6$ are as defined hereinbefore.

The reaction is carried out advantageously by bringing the reactants together in substantially equimolar proportions in the presence of an inert solvent, illustratively, a lower alkanol such as methanol, ethanol, isopropyl alcohol, and the like. For convenience, it is preferable to carry out the reaction at elevated temperatures such as the boiling point of the inert solvent, but ordinary temperatures can be employed if desired. Generally speaking, the reaction is carried out advantageously at a temperature within the range of about 20° C. to about 150° C. and preferably within the range of about 35° C. to about 105° C.

The desired compound is isolated from the reaction mixture by conventional procedures, for example, by dilution of the reaction mixture with water, followed by basification of the solution and isolation of the precipitate by filtration. The compound so obtained can be purified by conventional procedures, for example, by recrystallization.

(b) The alkyl 2-(5,6-dialkyl-2-benzimidazolyl)alkanoate so obtained is then condensed with a substituted 1,2-phenylene-diamine of the formula:

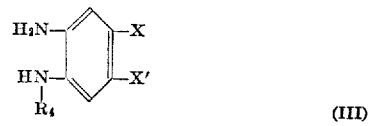

(III)

wherein one of X and X′ is hydrogen and the other is selected from the group consisting of nitro (—$NO_2$) and acylamido (—NHacyl) wherein "acyl" is the acyl radical of any monocarboxylic acid, suitably a hydrocarbon monocarboxylic acid of from 2 to 12 carbon atoms, inclusive, and $R_4$ is as defined hereinbefore, to obtain the compound of the formula:

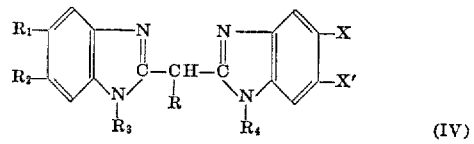

(IV)

wherein R, $R_1$, $R_2$, $R_3$, $R_4$, X, and X′ are as defined hereinbefore. Advantageously, the reaction is carried out by heating the reactants together alone or, if desired, in the presence of an inert solvent such as trichlorobenzene, decalin, tetralin, and the like. Preferably, the reaction is carried out in the presence of an inert solvent at a temperature within the range of about 150° C. to about 250° C. and preferably within the range of about 175° C. to about 225° C. Advantageously, the reactants are present in substantially equimolar proportions. Generally speaking, the desired compound having the Formula IV separates on cooling the reaction mixture and can be isolated therefrom by filtration. The compound so obtained can be purified by conventional procedures, for example, by recrystallization.

Suitable hydrocarbon monocarboxylic acids include (a) a saturated or unsaturated straight or branched chain aliphatic carboxylic acid such as acetic, propionic, butyric, isobutyric, tert, butylacetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid such as cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated cycloaliphatic-substituted aliphatic carboxylic acid such as cyclopentaneacetic acid, cyclopentanepropionic acid, cyclopenteneacetic acid, cyclohexanebutyric acid, methylcyclohexaneacetic acid, and the like; (d) an aromatic carboxylic acid such as benzoic acid, toluic acid, naphthoic acid, ethylbenzoic acid, isobutylbenzoic acid, methylbutylbenzoic acid, and the like; and (e) an aromatic-aliphatic carboxylic acid such as phenylacetic acid, phenylpropionic acid, phenylvaleric acid, cinnamic acid, phenylpropiolic acid, naphthylacetic acid, and the like.

The hydrocarbon monocarboxylic acids as hereinbefore defined can also be substituted by one or more halogen atoms, nitro, hydroxy, amino, cyano, thiocyano, or lower-alkoxy groups. By "lower-alkoxy" is meant an alkoxy group containing from one to six carbon atoms, inclusive, such as methoxy, ethoxy, propoxy, butoxy, amyloxy, hexyloxy, and isomeric forms thereof. Examples of substituted hydrocarbon carboxylic acid acyl radicals falling within the above definition are the acyl radicals corresponding to chloroacetic acid, chloropropionic acid, bromobutyric acid, iodovaleric acid, chlorocyclohexanecarboxylic acid, o-, m-, and p-chlorobenzoic acids, anisic acid, salicylic acid, p-hydroxybenzoic acid, o-, m-, and p-nitrobenzoic acids, cyanoacetic acid, thiocyanoacetic acid, cyanopropionic acid, lactic acid, glycine, and the like.

The compounds having the structural Formula IV wherein X or X' is nitro, can be readily converted to the monoamino-substituted 2,2'-alkylenebisbenzimidazoles of this invention (compounds having the Formula I, above) by any of the means commonly used to convert aromatic nitro compounds to aromatic amino compounds. Illustratively, a compound having the structural Formula IV wherein X or X' is nitro can be reduced to the corresponding amino compound by catalytic hydrogenation or electrolytic reduction, and by using chemical reducing agents, e.g., ammonium sulfide or ferrous sulfate in alkaline solution. Catalytic hydrogenation is preferred, particularly catalytic hydrogenation in the presence of a noble metal catalyst. For example, catalytic hydrogenation can be employed in the presence of a noble metal catalyst such as palladium (advantageously supported on charcoal, calcium carbonate, or other conventional supports), platinum oxide, and the like; or a base metal catalyst, such as Raney nickel, Raney cobalt, and the like; and in the presence of an inert solvent such as dioxane, methyl alcohol, ethyl alcohol, isopropyl alcohol, and the like. Pressures ranging from about atmospheric pressure to about 50 lbs. per square inch, and temperature conditions ranging from about 10° C. to about 50° C. can be employed in conducting the hydrogenation, atmospheric pressure and reaction temperatures of about 20° C. to about 30° C. ordinarily being very convenient. Other suitable emthods of reducing aromatic nitro compounds to aromatic amino compounds are described in Kirk and Othmer, Encyclopedia of Chemical Technology, vol. 1, pp. 673–691.

The compounds having the structural Formula IV, wherein X or X' is acylamido, can be readily converted to the mono-amino-substituted 2,2'-alkylenebisbenzimidazoles of this invention (compounds of Formula I) by cleaving the acyl group from the acylamido group. The desired cleavage can be effected, for example, by acid hydrolysis to obtain the corresponding monoamino-substituted 2,2'-alkylenebisbenzimidazole and recovering the free amine or acid addition salt thereof by conventional methods.

It will be appreciated that the above procedure can be varied by employing the phenylenediamine having the Formula III in stage (a) and the phenylenediamine having the Formula II in stage (b). That is to say, in a variation of the above process, stage (a) comprises the condensation of a phenylenediamine having the Formula III with an acid addition salt of a carbalkoxyacetimino alkyl ether to yield the corresponding alkyl 2-(2-benzimidazolyl)alkanoate. Stage (b) then comprises the reaction of the latter compound with a phenylenediamine having the Formula II to yield the compound having the Formula IV which in turn is converted to the desired compound having the Formula I by the indicated methods.

The acid addition salts of the carbalkoxyacetimino alkyl ether base employed in stage (a) of the process described above are prepared by treating the corresponding alkyl α-cyanoalkanoate

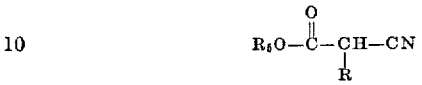

wherein R and $R_5$ are as defined hereinbefore, with the appropriate acid in the presence of the appropriate alkanol, $R_6OH$, wherein $R_6$ is as defined hereinbefore. For example, the hydrochloride of the carboalkoxyacetimino alkyl ether is prepared advantageously by passing anhydrous hydrogen chloride gas into a mixture of the alkyl α-cyanoalkanoate and the alkanol in solution in an inert solvent such as ether. Preferably, the reaction is carried out at a temperature of the order of 0° C. The alkyl α-cyanoalkanoate and alkanol are employed in substantially equimolar proportions and the desired hydrochloride separates from the reaction mixture. Generally speaking, the product so obtained is in a sufficient state of purity to be used without further treatment, but if desired, the compound can be purified by conventional procedures, for example, by recrystallization.

The 4,5-dialkyl-1,2-phenylenediamines having the Formula II above, which are employed as starting materials in the above-described process are known in the art or can be prepared by methods which are well-known in the art. For example, the 4,5-dialkyl-1,2-phenylenediamines of the Formula II wherein $R_3$ is hydrogen, can be prepared by nitration of the corresponding 1,2-dialkylbenzenes to yield the corresponding 1,2-dialkyl-4-nitrobenzenes, reduction of the latter to the corresponding 3,4-dialkylaniline, conversion of the aniline so obtained to its urethane, nitration of the latter followed by hydrolysis to yield the corresponding 4,5-dialkyl-2-nitroaniline, and reduction of the nitro compound so obtained to yield the desired 4,5-dialkyl-1,2-phenylenediamine. The procedure involved in the above series of reactions is preferably that described by Lambooy, J. Am. Chem. Soc. 71, 3756, 1949, for the preparation of 4,5-diethyl-1,2-phenylenediamine.

The 1,2-phenylenediamines having the Formula II above, wherein $R_3$ represents lower-alkyl, which are employed as starting compounds in the above-described reaction, can be prepared by known methods, e.g., the method described in U.S. Patent 2,400,872, for the preparation of N-methyl- and N-ethyl-1,2-phenylenediamine.

The 4- and 5-nitro-1,2-phenylenediamines having the Formula III above are readily prepared by known methods, for example, by selective reduction of N-ethyl-2,4-dinitroaniline with ammonium sulfide according to the method described by Foster, J. Chem. Soc. 1957, 4687 to obtain N-ethyl-4-nitro-1,2-phenylenediamine. Likewise Phillips, J. Chem. Soc. 1931, 1143, prepared N-methyl-5-nitro-1,2-phenylenediamine from 2-chloro-5-nitroaniline by methylation with dimethyl sulfate to obtain 2-chloro-5-nitro-N-methylaniline followed by reaction with ammonia to obtain N-methyl-5-nitro-1,2-phenylenediamine.

Moreover, 4- or 5-acylamido-1,2-phenylenediamines according to Formula III wherein X or X' is an acylamido group can be readily prepared from the corresponding acylamido-2-nitroanilines (prepared according to the procedure described by Bülow et al., Ber. 30, 981, 1897), by reducing the 2-nitro group as above to produce the corresponding 4- or 5-acylamido-1,2-phenylenediamine.

The acid addition salts of the invention comprise the salts of the compounds having the Formula I, above, with acids. The acid addition salts can be prepared by conventional methods. For example, the compound having the Formula I can be treated with at least a stoichiometric amount of the appropriate acid; and depending upon the nature of the solvent employed, the desired salt will separate spontaneously or can be precipitated by the addition of a solvent in which the salt is insoluble. A pharmacologically acceptable acid addition salt can be prepared using acids such as sulfuric, hydrochloric, hydrobromic, nitric, phosphoric, benzoic, p-toluenesulfonic, salicylic, acetic, propionic, tartaric, citric, succinic acids, and the like. Likewise, the compounds of this invention having Formula I above can be reacted with fluosilicic acid in accordance with U.S. Patents 1,915,334 and 2,075,359, for preparing amine fluosilicate mothproofing agents and in accordance with U.S. Patents 2,425,320 and 2,606,115 in preparing amine thiocyanate-formaldehyde condensation products for use as pickling inhibitors.

When used in therapy, the novel monoamino-substituted 2,2'-alkylenebisbenzimidazoles of the invention can be formulated, as the essential active ingredient, in novel unit dosage compositions for administration via oral or parenteral routes. Suitably, the compositions comprise the essential active ingredient and a solid or fluid pharmaceutical carrier. Convenient solid pharmaceutical carriers for solid compositions include, e.g., cornstarch, lactose, dicalcium phosphate, terra alba (calcium sulfate), talc, stearic acid, magnesium stearate, gums, and functionally similar materials. Suitable solid compositions include tablets, pills, capsules, granules, powders, wafers, and cachets. Fluid pharmaceutical carriers for fluid compositions advantageously comprise water; oils, for example, cottonseed oil, sesame oil, and peanut oil; and oil-water emulsions. Appropriate fluid compositions include solutions, supensions, syrups, oil-water emulsions, and the like.

The following examples are illustrative of the process and products of the present invention, but are not to be construed as limiting.

EXAMPLE 1

*Preparation of 5'-Amino-5,6-Dimethyl-2,2-Methylenebisbenzimidazole and the Trihydrochloride Thereof*

PART A—PREPARATION OF 4-ACETAMIDO-1,2-PHENYLENEDIAMINE

A suspension of 10 g. (0.051 mole) of 4-acetamido-2-nitroaniline in 30 ml. of ethanol was hydrogenated in the presence of 10% palladium-on-charcoal catalyst. When the theoretical amount of hydrogen had been absorbed the reaction mixture was filtered to remove the catalyst, and the filtrate consisting of 4-acetamido-1,2-phenylenediamine dissolved in ethanol was used in the subsequent step of the process without further purification.

PART B—PREPARATION OF 2-CARBETHOXYACETIMINO ETHYL ETHER HYDROCHLORIDE

A solution of 113 g. (1 mole) of ethyl cyanoacetate in a mixture of 46 g. (1 mole) of anhydrous ethanol and 3 liters of anhydrous ether was stirred and cooled to 0° C. Anhydrous hydrogen chloride was passed into the cooled solution until the latter was saturated. The mixture was then stirred at 0° C. for a further 3 hours. The solid which had separated was isolated by filtration, washed thoroughly with ether on the filter, and dried in vacuo. There was thus obtained 179 g. of 2-carbethoxyacetimino ethyl ether hydrochloride in the form of a white solid having a melting point of 111° to 113° C. (dec.).

PART C—PREPARATION OF ETHYL 2-(5-ACETAMIDO-2-BENZIMIDAZOLYL)ACETATE

Ten g. (0.051 mole) of carbethoxyacetimino ethyl ether hydrochloride was added to the ethanol solution of 4-acetamido-1,2-phenylenediamine (Part A, above) and the reaction mixture was refluxed for 45 min. After evaporating the ethanol, the residue thus obtained was washed with water, and was recrystallized twice from ethanol: water to give 6.8 g. of ethyl 2-(5-acetamido-2-benzimidazolyl)acetate having a melting point of 188° to 190° C.

*Analysis.*—Calcd. for $C_{13}H_{15}N_3O_3$: C, 59.76; H, 5.79; N, 16.08. Found: C, 59.46; H, 5.88; N, 16.13.

PART D—PREPARATION OF 5'-ACETAMIDO-5,6-DIMETHYL-2,2'-METHYLENEBISBENZIMIDAZOLE

A mixture consisting of 2.61 g. (0.1 mole) of ethyl 2-(5-acetamido-2-benzimidazolyl)acetate (Part C, above) and 1.36 g. (0.1 mole) of 4,5-dimethyl-1,2-phenylenediamine was dissolved in 50 ml. of hot 1,2,4-trichlorobenzene. The solution was heated with stirring at 190° to 200° C. for 2 hours, and after cooling, the solid that had separated was recovered on a filter and washed with benzene. The washed solid was then triturated in 100 ml. of 5% hydrochloric acid and filtered. The filtrate was made alkaline with ammonia and the 5'-acetamido-5,6-dimethyl-2,2'-methylenebisbenzimidazole thus obtained was washed with water and dried. This material was used in the next step without further purification.

PART E—PREPARATION OF 5'-AMINO-5,6-DIMETHYL-2,2'-METHYLENEBISBENZIMIDAZOLE AND THE TRIHYDROCHLORIDE THEREOF

The 5'-acetamido-5,6-dimethyl-2,2' - methylenebisbenzimidazole prepared in Part D, above, was heated in 15 ml. of 20% hydrochloric acid for about seven hours. After basifying the reaction mixture with ammonia, 5'-amino-5,6-dimethyl-2,2'-methylenebisbenzimidazole separated as a solid and was recovered on a filter. The solid free base thus obtained was dissolved in hot methyl Cellosolve (monomethyl ether of ethylene glycol) and an excess of hydrochloric acid was added. On cooling, 5'-amino-5,6-dimethyl-2,2'-methylenebisbenzimidazole trihydrochloride separated as a solid monohydrate and was recovered on a filter. After washing with ethanol and drying, the compound had a melting point of 304° C. (dec.).

*Analysis.*—Calcd. for $C_{17}H_{20}Cl_3N_5 \cdot H_2O$: C, 48.76; H, 5.30; N, 16.73; Cl, 25.40. Found: C, 49.14; H, 5.09; N, 16.94; Cl, 24.65.

EXAMPLE 2

*Preparation of 5'-Amino-5,6-Dimethyl-2,2'-Methylenebisbenzimidazole and the Trihydrochloride Thereof*

PART A—PREPARATION OF ETHYL 2-(5,6-DIMETHYL-2-BENZIMIDAZOLYL)ACETATE

A mixture of 6.8 g. (0.05 mole) of 4,5-dimethyl-1,2-phenylenediamine (Beilstein's Handbuch der Organischen Chemie, 13, 179, 4th edition, 1930), and 9.8 g. (0.05 mole) of 2-carbethoxyacetimino ethyl ether hydrochloride (Example 1, Part B) in 100 ml. of absolute ethanol was heated under reflux for 1 hour. After cooling the mixture, 100 ml. of water was added and the resulting slurry was made alkaline by the addition of aqueous ammonium hydroxide solution. The solid which had separated was isolated by filtration, washed thoroughly with water, and recrystallized from ethanol. There was thus obtained 8 g. of ethyl 2-(5,6-dimethyl-2-benzimidazolyl)-acetate in the form of a crystalline solid having a melting point of 177° to 181° C.

PART B—PREPARATION OF 5'-NITRO-5,6-DIMETHYL-2,2'-METHYLENEBISBENZIMIDAZOLE AND THE DIHYDROCHLORIDE THEREOF

A mixture of 4.64 g. (0.2 mole) of ethyl 2-(5,6-dimethyl-2-benzimidazolyl)acetate (Part A) and 3.06 g. (0.2 mole) of 4-nitro-1,2-phenylenediamine in 100 ml. of 1,2,4-trichlorobenzene was heated with stirring in an oil bath to 180° C. Reaction began at this temperature, and the alcohol and water produced by the reaction were collected in a trap. As the reaction proceeded, the temperature was gradually raised to 210° C., and after 30 min. at this temperature the theoretical amount of ethanol and water had accumulated in the trap. As the reaction mixture cooled, 5'-nitro-5,6-dimethyl-2,2'-methylenebisbenzimidazole separated. The product thus obtained was suspended in hot methyl Cellosolve and treated with an excess of concentrated hydrochloric acid. The acid mixture was kept hot for 15 minutes, and after allowing it to cool for 1 hr., there was obtained 4.3 g. of red 5'-nitro-5,6-dimethyl-2,2'-methylenebisbenzimidazole dihydrochloride having a melting point higher than 360° C.

*Analysis.*—Calcd. for $C_{17}H_{17}Cl_2N_5O_2$: C, 51.78; H, 4.35; N, 17.76. Found: C, 52.10; H, 4.42; N, 16.92.

PART C—PREPARATION OF 5'-AMINO-5,6-DIMETHYL 2,2'-METHYLENEBISBENZIMIDAZOLE AND THE TRIHYDROCHLORIDE THEREOF

A solution of 2 g. (0.051 mole) of 5'-nitro-5,6-dimethyl-2,2'-methylenebisbenzimidazole dihydrochloride (Part B, above) in 50 ml. of absolute ethanol containing 5 ml. of concentrated hydrochloric acid was hydrogenated in the presence of platinum oxide catalyst until the absorption of hydrogen was complete. Addition of a small amount of water caused the solids in suspension to dissolve. The catalyst was removed by filtration and the solvent was evaporated under reduced pressure. The red solid thus obtained was dissolved in water, and the solution was made alkaline with ammonia. A fine, red solid separated; this product, 5'-amino-5,6-dimethyl-2,2'-methylenebisbenzimidazole, was recovered on a filter and dissolved in methanol. The methanol solution was treated with an excess of anhydrous hydrogen chloride and chilled. The 5'-amino-5,6-dimethyl-2,2'-methylenebisbenzimidazole trihydrochloride which separated was recovered on a filter, washed with ethanol, and dried. It had a melting point of 310° C. (dec.).

EXAMPLE 3

*Preparation of 6'-Amino-1'5,6-Trimethyl-2,2'-Methylenebisbenzimidazole and the Trihydrochloride Thereof*

Following the procedure of Example 2, Part B, but substituting N-methyl-5-nitro-1,2-phenylenediamine for 4-nitro-1,2-phenylenediamine, there was prepared the corresponding 6'-nitro-1',5,6-trimethyl-2,2'-methylenebisbenzimidazole which was then hydrogenated and acidified with hydrochloric acid according to the procedure of Example 2, Part C, to obtain 6'-amino-1',5,6-trimethyl-2,2'-methylenebisbenzimidazole and the trihydrochloride thereof.

EXAMPLE 4

*Preparation of 5'-amino-5,6-dimethyl-1-ethyl-2,2'-methylenebisbenzimidazole and the trihydrochloride thereof*

Following the procedure of Example 1, Part D, but substituting N-ethyl-4,5-dimethyl-1,2-phenylenediamine for 4,5-dimethyl-1,2-phenylenediamine, there was prepared the corresponding 5'-acetamido-5,6-dimethyl-1-ethyl-2,2'-methylenebisbenzimidazole, which was hydrolyzed and acidified with hydrochloric acid according to the procedure of Example 1, Part E, to obtain 5'-amino-5,6-dimethyl-1-ethyl-2,2'-methylenebisbenzimidazole and the trihydrochloride thereof.

EXAMPLE 5

*Preparation of 5'-amino-5,6-diethyl-2,2'-methylenebisbenzimidazole and the trihydrochloride thereof*

Following the procedure of Example 1, Parts D and E, but substituting 4,5-diethyl-1,2-phenylenediamine (Lambooy, supra) for 4,5-dimethyl-1,2-phenylenediamine, there were prepared the corresponding 5'-acetamido-5,6-diethyl-2,2'-methylenebisbenzimidazole, and 5'-amino-5,6-diethyl-2,2'-methylenebisbenzimidazole and the trihydrochloride thereof.

EXAMPLE 6

*Preparation of 5'-amino-5,6-dimethyl-2,2'-propylidenebisbenzimidazole and the trihydrochloride thereof*

Following the procedure of Example 1, Part B, but substituting ethyl α-cyanobutyrate (Alexander et al., J. Am. Chem. Soc. 66, 886, 1944), for ethyl cyanoacetate, there was prepared 2-carbethoxybutyrimino ethyl ether hydrochloride. Following the procedure described in Example 1, Part C, but substituting 2-carbethoxybutyrimino ethyl ether hydrochloride for 2-carbethoxyacetimino ethyl ether hydrochloride there was prepared ethyl 2-(5-acetamido-2-benzimidazolyl)butyrate. The latter compound was then condensed with 4,5-dimethyl-1,2-phenylenediamine using the procedure described in Example 1, Part D, to prepare 5'-acetamido-5,6-dimethyl-2,2'-propylidenebisbenzimidazole. The compound thus obtained was converted to 5'-amino-5,6-dimethyl-2,2'-propylidenebisbenzimidazole and the trihydrochloride thereof using the procedure of Example 1, Part E.

EXAMPLE 7

*Preparation of 5'-amino-5,6-dimethyl-2,2'-(2,4-dimethylpentylidene)bisbenzimidazole and the trihydrochloride thereof*

Following the procedure of Example 6, but substituting ethyl α-cyano-β,δ-dimethylcaproate (Alexander et al., supra) for ethyl α-cyanobutyrate, there were prepared 5-amino-5,6-dimethyl-2,2'-(2,4 - dimethylpentylidene)bisbenzimidazole and the trihydrochloride thereof.

EXAMPLE 8

*Preparation of 5'-amino-5,6-dimethyl-1'-n-hexyl-2,2'-methylenebisbenzimidazole and the trihydrochloride thereof*

Following the procedure of Example 2, Part B, but substituting N-(n-hexyl)-4-nitro-1,2-phenylenediamine for 4-nitro-1,2-phenylenediamine, there was prepared the corresponding 5'-nitro-5,6-dimethyl-1'-n-hexyl-2,2'-methylenebisbenzimidazole, which in turn was hydrogenated and acidified with hydrochloric acid according to the procedure of Example 2, Part C, to obtain 5'-amino-5,6-dimethyl-1'-n-hexyl-2,2'-methylenebisbenzimidazole and the trihydrochloride thereof.

EXAMPLE 9

*Preparation of 5'-amino-5,6-dimethyl-2,2'-ethylidenebisbenzimidazole and the trihydrochloride thereof*

Following the procedure of Example 6, but substituting ethyl α-cyanopropionate for ethyl α-cyanobutyrate, there were prepared 5' - amino - 5,6 - dimethyl-2,2'-ethylidenebisbenzimidazole and the trihydrochloride thereof.

EXAMPLE 10

Ten thousand (10,000) scored tablets for oral use, each containing 100 mg. of 5'-amino-5,6-dimethyl-2,2'-methylenebisbenzimidazole trihydrochloride, were prepared from the following ingredients:

| | Grams |
|---|---|
| 5'-amino-5,6-dimethyl-2,2'-methylenebisbenzimidazole trihydrochloride | 1000 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 1 to 2 tablets 2 to 4 times daily.

I claim:

1. A compound selected from the group consisting of (a) the compound of the formula wherein R, R₃, and R₄ are selected from the class consisting of hydrogen and alkyl of from 1 to 6 carbon atoms, inclusive, R₁ and R₂ are alkyl of from 1 to 3 carbon atoms, includes, and one of M and M' is amino (—NH₂), the other being hydrogen, and (b) acid addition salts thereof.

2. 5'-amino-5,6-dimethyl-2,2'-methylenebisbenzimidazole.

3. 5'-amino-5,6-dimethyl-2,2'-methylenebisbenzimidazole trihydrochloride.

4. 5'-amino-5,6-dimethyl-2,2'-ethylidenebisbenzimidazole.

5. 5'-amino-5,6-dimethyl-2,2'-ethylidenebisbenzimidazole trihydrochloride.

6. A compound selected from the group consisting of (a) the compound of the formula

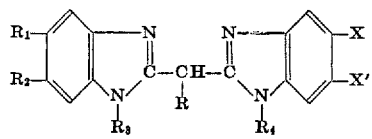

wherein R, R₃, and R₄ are selected from the class consisting of hydrogen and alkyl of from 1 to 6 carbon atoms, inclusive, R₁ and R₂ are alkyl of from 1 to 3 carbon atoms, inclusive, and one of X and X' is hydrogen and the other is selected from the group consisting of nitro and acylamido, wherein "acyl" is an acyl group of a monocarboxylic acid of from 2 to 12 carbon atoms, inclusive, and (b) acid addition salts thereof.

7. 5'-nitro-5,6 - dimethyl - 2,2'-methylenebisbenzimidazole.

8. 5'-nitro-5,6 - dimethyl - 2,2'-methylenebisbenzimidazole dihydrochloride.

9. 5'-acetamido-5,6-dimethyl-2,2'-methylenebisbenzimidazole.

References Cited in the file of this patent
UNITED STATES PATENTS 2,488,289    Meyer et al. _____ Nov. 15, 1949

OTHER REFERENCES

Wang et al.: Jour. Amer. Chem. Soc, vol 79, pp 5706–8 (1951).

Lane: J. Chem. Soc., 1955, pages 1079–81.